United States Patent [19]
Rey

[11] Patent Number: 5,250,189
[45] Date of Patent: Oct. 5, 1993

[54] METHOD FOR REMOVING PAINT SOLIDS FROM WATER-BASED PAINT SYSTEMS USING ALUMINUM SALTS

[75] Inventor: Paul A. Rey, Coraopolis, Pa.

[73] Assignee: Calgon Corporation, Pittsburgh, Pa.

[21] Appl. No.: 699,549

[22] Filed: May 14, 1991

[51] Int. Cl.$^5$ .............................................. C02F 1/52
[52] U.S. Cl. .................................. 210/712; 210/725;
210/727; 210/728; 210/734; 210/930; 134/38;
427/331; 95/197
[58] Field of Search ............... 210/930, 712, 724, 725,
210/726, 727, 728, 733, 734, 735; 55/85, 84, 89;
134/38; 427/331

[56] References Cited

U.S. PATENT DOCUMENTS

| | | | |
|---|---|---|---|
| 3,515,575 | 6/1970 | Arnold | 210/930 |
| 3,861,887 | 1/1975 | Forney | 55/85 |
| 3,956,171 | 5/1976 | Moore, Jr. et al. | 252/313.2 |
| 3,990,986 | 11/1976 | Gabel et al. | 252/181 |
| 4,002,490 | 1/1977 | Michalski et al. | 134/38 |
| 4,026,794 | 5/1977 | Mauceri | 210/708 |
| 4,130,674 | 12/1978 | Roberts et al. | 427/331 |
| 4,401,574 | 8/1983 | Farrington et al. | 210/908 |
| 4,440,647 | 4/1984 | Puchalski | 210/725 |
| 4,629,572 | 12/1986 | Leitz et al. | 210/714 |
| 4,637,824 | 1/1987 | Pominville | 55/85 |
| 4,656,059 | 4/1987 | Mizuno et al. | 210/729 |
| 4,759,855 | 7/1988 | Kaiser | 210/712 |
| 4,853,132 | 8/1989 | Merrell et al. | 210/930 |
| 4,880,471 | 11/1989 | Kaiser | 106/286.6 |

FOREIGN PATENT DOCUMENTS 0293129 11/1988 European Pat. Off. .

Primary Examiner—Stanley S. Silverman
Assistant Examiner—Neil M. McCarthy
Attorney, Agent, or Firm—W. C. Mitchell; C. M. Caruso

[57] ABSTRACT

Methods of treating circulating water containing oversprayed, water-borne paint, such as in a paint spray booth operation, with aluminum salts such as aluminum chloride or polyaluminum chloride and a flocculant, resulting in removal of sludge from the paint spray booth water.

10 Claims, 4 Drawing Sheets

METHOD FOR REMOVING PAINT SOLIDS FROM WATER-BASED PAINT SYSTEMS USING ALUMINUM SALTS

BACKGROUND OF THE INVENTION

Automobile bodies and many industrial and consumer articles are conventionally spray painted in areas called spray booths, wherein water is employed to cleanse the air of over-sprayed paint. The wash water is then treated to remove paint solids, and the treated water is recirculated. The circulating water typically contains less than about 10,000 ppm of suspended solids. A well run system generally contains less than about 500 ppm of suspended solids in the circulating water.

Fine droplets of over-sprayed paint, emitted by a spray gun, contact and are captured by the water. The amount of paint contacting a water curtain may change depending on a number of variables, including plant or process shutdowns, the size and shape of the object being painted, the type of spray equipment used, the spraying and purge technique used, the water flow rate and the type of paint used.

In the past, solvent-based or solvent-borne paints have commonly been employed in spray booths. Federal regulations now limit the amount of volatile organic compounds (i.e., vocs) that can be released at a given plant site. Since organic solvent diluents used in solvent-based paint are a major source of vocs, water-borne or water-based paints are now being used in spray booth operations to help comply with these regulations.

The term "water-based paints", as used herein, refers to all varieties of coatings which contain in excess of approximately 10% water in the coating formulation, including, but not limited to, water-reducible alkyd and epoxy ester compositions, water-borne thermoplastic compositions using acrylic polymer/copolymers, water-based polyurethane dispersions, and blends of such compositions. As used herein, the terms "water-based paints" and "water-borne paints" are synonymous.

A primary treatment objective relative to solvent-based paints concerns the tacky or adhesive nature of the over-sprayed coating material. Due to their hydrophobicity, solvent-based solids tend to coalesce and adhere to the walls, ceilings, floors or spray areas of spray booth systems and in their scrubber sections. Thus, the over-sprayed paint mist captured in the water system of a spray booth must be detackified, or "killed," to prevent accumulation on the walls, piping, etc. of the spray booth system. Paint that sticks to spray booth surfaces usually cannot be easily removed from equipment and tends to build up over time, thereby hampering spray booth efficacy.

In contrast, the primary treatment objective relative to water-based paints is to capture and collect finely-dispersed paint solids. Water-based paints are not tacky in nature. However, without treatment, these paints tend to remain dispersed due to their compatability with water. Ultimately, uncaptured solids accumulate in the system and settle in sludge recovery pits and in booth weirs. Such solids encourage the growth of anaerobic bacteria colonies which may result in odor problems. This treatment problem is aggravated by the use of water-based paints because such paints generally contain resins and dyes which are highly compatible with water.

Other problems which severely interfere with spray booth operations occur in areas of high agitation where foaming occurs and in areas where foam accumulates. Foaming is caused by chemical additives, surfactants, solvents or combinations thereof. Also, finely dispersed paint solids which are not captured and removed tend to stabilize foam, which aggravates foaming problems. Foaming generally mandates that copious amounts of defoamers be used, which results in higher operating costs. Water-based paints generally tend to cause foaming to a greater extent than solvent-based paints.

A wide variety of chemicals have been proposed as treating agents for circulating wet spray booth waters containing over-spray paint, including compositions containing polymers and amphoteric metal salts which form insoluble hydroxides at pH's greater than about 7. The use of combinations of this type are described in the following U.S. Pat. Nos.: 3,861,887 to Forney; 3,990,986 to Gabel et al; 4,002,490 to Michalski et al; 4,130,674 to Roberts et al; and 4,440,647 to Puchalski. Further, U.S. Pat. No. 4,637,824 to Pominville discloses the use of silicates and polydiallyldialkylammonium halides with amphoteric metal salts, and U.S. pat. No. 4,853,132 to Merrell et al discloses the use of precipitates formed by the reaction of cationic polymers and salts of inorganic anions to detackify solvent-based paints. Bentonite clays, aluminum salts and zinc salts have also been used with cationic polymers. U.S. Pat. No. 4,401,574 to Farrington et al discloses the use of polyaluminum chloride to flocculate and settle dispersed paint solids resulting from the production of latex paints and U.S. Pat. No. 4,026,794 to Mauceri discloses water soluble salts of amphoteric metals in combination with dimethyl diallyl ammonium polymers to break oil-in-water emulsions. JP52071538 discloses the use of coagulants such as aluminum sulphate, aluminum polychloride and calcium hydroxide in combination with polymer accelerators to aggregate coating particles in coating booth waste water steams. U.S. Pat. Nos. 4,759,855 and 4,880,471 disclose the use of alkaline zinc solutions containing ammonium hydroxide and ammonium chloride to treat over-sprayed paint.

SUMMARY OF THE INVENTION

Figure 1:
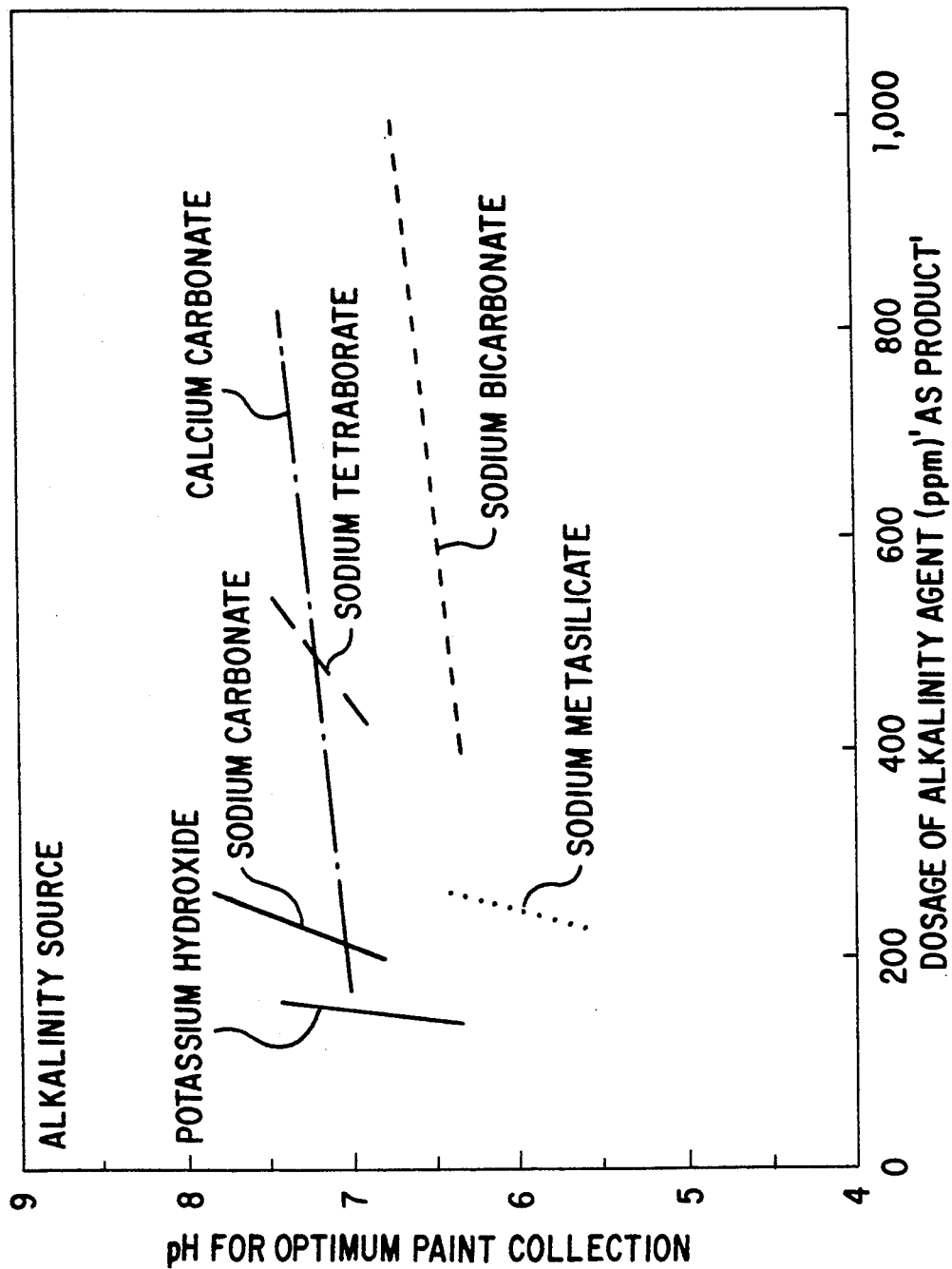
FIG. 1 shows relationship between pH and alkalinity using various alkalinity sources in a system containing water-borne paints. In this figure, the pH for optimum paint collection is that pH where water clarity and paint flotation are maximized, with minimal suspended solids. This figure represents a system containing a CIL white water-borne paint with 1000 ppm of aluminum chlorohydrate.

The instant inventor has discovered that aluminum salts, in conjunction with specified polymeric flocculants, applied within designated pH and alkalinity ranges, can be used with improved results to treat water which collects and/or contains water-based paints. The relationship between paint addition and aluminum addition is not believed to be critical due to the non-tacky nature of the paint. The water, after capture and removal of the oversprayed, water-borne paint therefrom, is typically recirculated in paint spray booth operations. More particularly, the present invention relates to a method of treating the circulating water of a paint spray booth system used to capture over-sprayed, water-borne paint, which water contains or will contain over-sprayed water-borne paint, to facilitate removal of over-sprayed, water-borne paint from such water. The method comprises a) maintaining the pH of the circulating paint spray booth water being treated between about 5.0 to about 9.0, preferably about 6.0 to about 8.0, by adding an appropriate acid or base, while maintaining alkalinity within the range of 50-2,000, on a calcium carbonate basis, preferably 100-1000 ppm; b) adding an effective amount of a designated aluminum salt to the water being treated; c) contacting the over-sprayed, water-borne paint with the pH and alkalinity-maintained paint spray booth water before the addition of an effective amount of the aluminum salt or contacting the over-sprayed water-borne paint with the pH and alkalinity-maintained water after the addition of an effective amount of the aluminum salt; d) adding an effective amount of a flocculant to the treated paint spray booth water; and e) removing the resulting sludge from the paint spray booth water.

The method of the present invention is highly efficient for treating systems containing a wide variety of water-based paints. Additionally, the present method generally produces a well-flocculated sludge which may be readily disposed of in land fills or by incineration.

These and additional advantages will be more apparent in view of the following detailed description.

DETAILED DESCRIPTION

The present invention relates to a method for treating circulating paint spray booth water containing or which will contain over-sprayed, water-based paint to facilitate the removal of the over-sprayed paint from the water being treated, i.e., the water of a spray booth system or operation. The present method comprises: a) maintaining the pH of the water in the aqueous system being treated, namely circulating paint spray booth water, between about 5.0 and 9.0, preferably about 6.0 to about 8.0, by adding an appropriate acid or base, while maintaining alkalinity within the range of 50-2,000 ppm on a calcium carbonate basis, preferably 100-1000 ppm; b) adding to said circulating water an effective amount of an aluminum salt; c) contacting over-sprayed water-borne paint with the pH and alkalinity-maintained paint spray booth water of step a) before or after addition of an effective amount of said aluminum salt; d) adding an effective amount of a flocculant to the pH and alkalinity-maintained circulating paint spray booth water, preferably after or simultaneous with addition of the aluminum salt; and e) removing the resulting sludge from the paint spray booth water.

The pH of the water being treated should be maintained between about 5.0 and about 9.0, preferably between about 6.0 and about 8.0. As the pH is lowered below about 5.0, corrosion in the system generally increases. Paint treated at pH less than 5 tends to be more adherent and stringy. These characteristics are not conducive to good sludge recovery. On the other hand, a pH of greater than about 9.0 generally results in greater solids dispersion, thus creating less efficient solids capture, and causes greater foam generation. Caustic and sulfuric acid are the preferred pH-adjustment agents, though other acids or bases can be used.

Aside from pH, the alkalinity of the system being treated should be maintained between about 50 and 2,000 ppm, preferably 100-1,000 ppm, on a calcium carbonate basis, based on the total weight of the water in the system being treated. The inventor has discovered that, for a given alkalinity agent and a given system, optimal treatment may be represented by a graph similar to FIG. 1, which shows effective alkalinity dosages vs. pH for the system represented. This figure also demonstrates that the impact of various alkalinity agents on pH can vary substantially.

Figure 2:
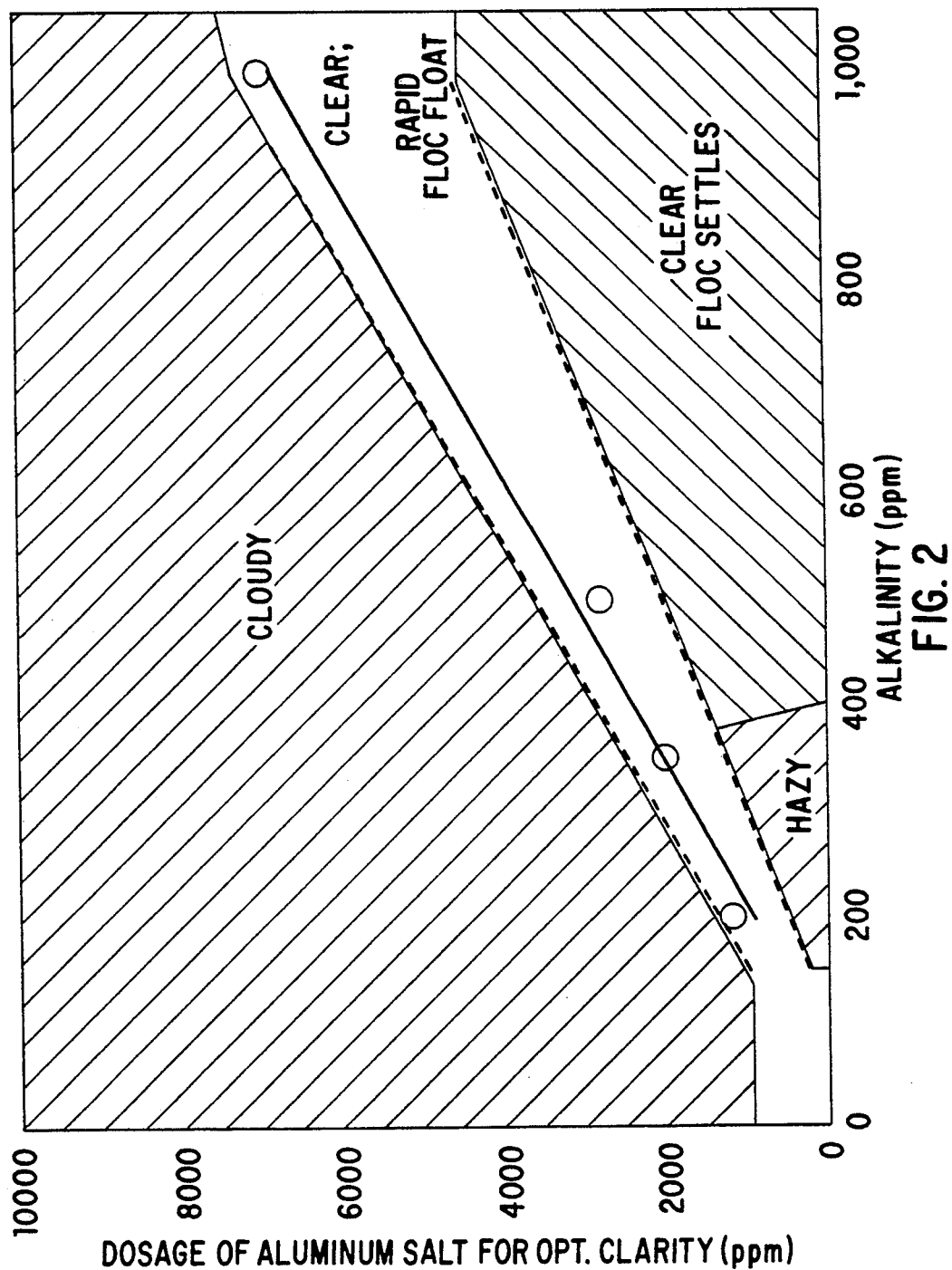
FIG. 2 shows the optimum operating window for a system containing a CIL white water-borne paint, sodium carbonate as the alkalinity source and aluminum chlorohydrate as the aluminum salt.

The inventor has discovered that optimum performance of the instant aluminum salt program is dependent on the aluminum salt used, the alkalinity and the pH. There is a preferred range of alkalinity/aluminum salt weight ratios for various alkalinity agent/aluminum salt combinations which can be used. These depend, among other things, on the ability of a given alkalinity agent to disperse the paint(s) being treated. As FIG. 2 shows, paint treated with too high of an aluminum/alkalinity ratio tends to result in a water high in suspended solids, whereas too low of an aluminum/alkalinity ratio generates flocculated paint solids which settle (instead of float), leaving behind a clear supernatant. The optimum aluminum/alkalinity ratio range varies depending on the type of alkalinity agent and the amount and type of aluminum salt used in treating the paint solids. As used herein, optimum performance is defined as that which yields floating paint solids, clear subnatant water (as measured by transmittance, for example) and low suspended solids. This is shown as the center are of FIG. 2.

Alkalinity, in addition to that normally present in the system being treated, can be provided by NaOH, KOH, sodium bicarbonate, sodium carbonate, sodium tetraborate, sodium metasilicate, or calcium carbonate (among others) and blends thereof. The preferred alkalinity sources are NaOH, KOH, sodium bicarbonate and sodium carbonate.

Figure 3:
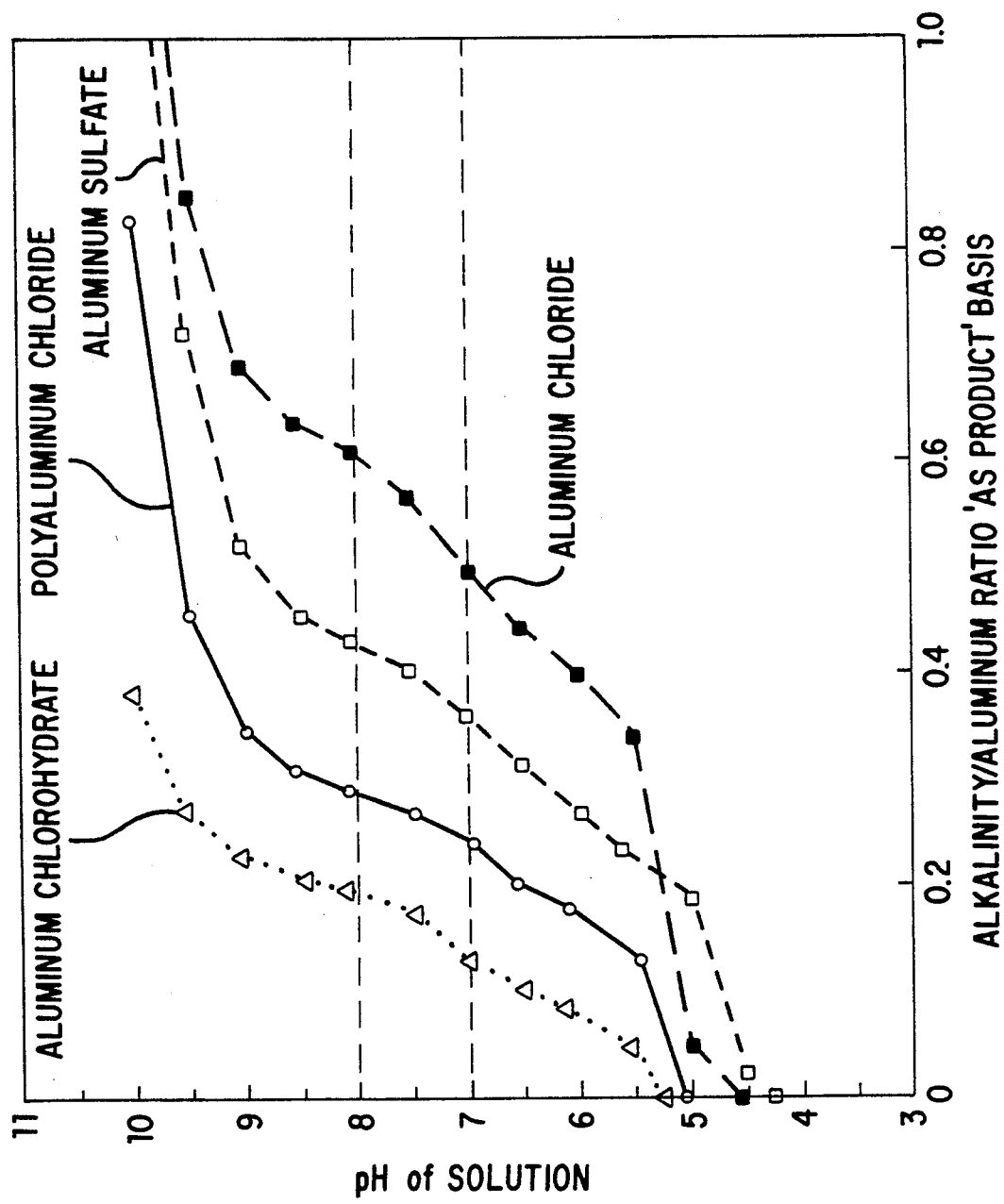
FIG. 3 shows the titration curves of various aluminum salts with a sodium carbonate alkalinity source.

While any aluminum salt can be used, the aluminum salts of this invention preferably contain a chloride anion. The preferred aluminum salts are aluminum chloride, aluminum chlorohydrate, polyaluminum chloride (PAC), also called basic aluminum chloride and is represented by the empirical formula $Al_n(OH)_mCl_{3n-m}$ ($n \geq 1.0$ and m:n ratio=0 to 2.5) and blends thereof. An advantage of the polymeric aluminum salts compared to other aluminum salts such as alum is that less pH adjustment is required. (See, for example, FIG. 3.) In addition, it has been discovered that the polymeric aluminum salts form a larger, more efficient floc than alum. The improved efficiency of these products reduces the chemical demand and results in less dissolved solids being added to the system. This is very important since most plants operate on total water recycle and one parameter that controls blowdown of the system is the accumulation of dissolved materials. Blowdown refers to the replacement of recycle water with fresh makeup water. Additionally, the preferred aluminum salts produce a better solids removal on an equivalent $Al_2O_3$ basis.

An effective amount of the aluminum salt is added. As used herein, the term "effective amount" refers to that amount of aluminum salt necessary to treat the paint solids present in a given system so as to yield a floc which floats, a clear subnatant and an acceptable level of suspended solids. Generally, about 1:20 to about 20:1 paint solids:aluminum salt is required, on a dry solids basis. Preferably, the dosage ranges from about 1:4 to about 4:1 paint solids:aluminum salt, and most preferably from about 1:3 to about 3:1 paint solids:aluminum salt. The aluminum salts may be added by any suitable means. Additionally, the aluminum salt/alkalinity source weight ratio is believed to be critical, as shown in FIG. 2. This figure shows that an aluminum chlorohydrate/sodium carbonate system has a specific aluminum salt/alkalinity ratio range wherein a clear subnatant is produced with a floc that floats. An effective aluminum salt/alkalinity ratio should be used. As used herein, an effective aluminum salt/alkalinity ratio is a ratio which gives a clear subnatant and a floc which floats, as exemplified by the center region of FIG. 2.

After oversprayed, water-based paint contacts the aluminum salt added to the circulating water, an effective amount of a polymer flocculant is added to the paint spray booth water system. The flocculant promotes the formation of a buoyant floc structure by binding the aluminum salt-conditioned paint particles while allowing air to be incorporated into the floc structure. The resulting floating floc facilitates the removal of paint solids from the circulating water system.

According to this invention, the type and molecular weight of the polymeric flocculant used are not believed to be critical. Generally, polymeric flocculants having weight average molecular weights of at least $2 \times 10^6$ are preferred. More preferably, the molecular weight should exceed about $6 \times 10^6$.

Examples of suitable flocculants include long chain high molecular weight polyacrylamides and copolymers of acrylic acid and acrylamide or long chain polymethacrylamides. Preferred flocculants are nonionic or slightly anionic polyacrylamides (hydrolyzed polyacrylamides) having a weight average molecular weight ranging from about $6 \times 10^6$ to about $20 \times 10^6$. Generally, the anionic functionality of such hydrolyzed polyacrylamides should not exceed about 30%, by weight.

Typical cationic polyelectrolytes which may be used as flocculants in the instant invention include but are not limited to polyphosphonium compounds, polysulfonium compounds, quaternary ammonium compounds, polymers of methacryloyloxethyl trimethyl ammonium methyl sulfate (METAMS), polymers of methacrylamido propyl trimethylammonium chloride (MAPTAC), polymers of acryloyloxyethyl trimethyl ammonium chloride (AETAC), polymers of methacryloyloxyethyl trimethyl ammonium chloride (METAC) and polymers prepared from combinations of METAMS, MAPTAC, AETAC and/or METAC with acrylamide and/or methacrylamide Representative of quaternary ammonium compounds are diethyl diallyl ammonium and dimethyl diallyl ammonium polymers and salts thereof.

Other acceptable flocculants are quaternary ammonium polymers such as polydimethyl diallyl ammonium chloride (polyDMDAAC), poly dimethyl diallyl ammonium bromide (polyDMDAAB), poly diethyl diallyl ammonium chloride (polyDEDAAB), or any of the same copolymerized with acrylamide or methacrylamide. The preferred molecular weights for the quaternary ammonium polymers are in excess of about 2,000,000.

The most preferred cationic flocculant is a polymer comprising dimethyl diallyl ammonium chloride and acrylamide, or a homologue thereof, having a weight average molecular weight in excess of about 4,000,000. The ratio of the nonionic moiety (for example, acrylamide or methacrylamide) to the cationic moiety should be greater than about 1:1, on an active weight basis.

Blends of the above listed flocculants can also be used.

An effective amount of the polymeric flocculant should be added. The effective amount depends primarily upon the quantity of over-sprayed paint and aluminum salt present in the system being treated. Preferably, the effective flocculant dosage will range from about 0.01 to about 150 parts (active weight basis) of the polymeric flocculant per part paint, and more preferably, 0.1 to 20 parts, on an active polymer:paint basis.

The function of the polymeric flocculant is two-fold: it interacts with the aluminum salt and the paint to form a large, buoyant, easily-captured floc, and it generally reduces foam formation in the system by removing colloidal particulates present in the water.

A requirement of the present invention is that the flocculant be added to the paint spray booth water after the over-sprayed, water-borne paint is contacted with the pH and alkalinity-maintained paint spray booth water. Thus, the flocculant can be added along with or after addition of the aluminum salt. The flocculant can be added by any convenient means. Once the treated paint solids have been contacted with at least one polymeric flocculant, the resulting sludge is removed from the water. This removal may be facilitated by any means known in the art, including but not limited to, flotation and filtration.

Other additives commonly used for the treatment of water containing oversprayed paint may generally be used in conjunction with the instant method. For example, bentonite clays, carbon black, talc, gums starch, dextrin, lime, aluminum oxide, silica solids, and casein among other additives, may be used as additional process aids in conjunction with the primary steps of the instant method. Additives from the class of amphoteric metal salts, including, but not limited to, ferric sulfate and ferric chloride, can also be used to enhance the performance of the instant invention.

EXAMPLES

The following examples are intended to further demonstrate the instant invention. They are not, however, intended to in any way limit the instant invention. In these examples, the following general procedure was followed:

1. The alkalinity of the water desired range with the designated alkalinity agent; the pH was adjusted, if necessary, to the desired value using caustic or sulphuric acid.
2. 200 mls of the alkalinity-adjusted water was added to a 400 ml wide mouth jar.
3. The water was mixed, using a Fisher Science Thermix Magnetic Stirrer Model 120M (setting 9 was used).
4. The designated aluminum salt was added.
5. 0.2 grams of the paint were added.
6. The dispersibility of the paint was noted.
7. The system was mixed for 45 seconds.
8. A flocculant solution [2 ml of 1 g/l polyacrylamide solution (active basis)] was added. A commercially available polyacrylamide having a molecular weight of 10–15 mm was used to prepare the flocculant solution.
9. The system was mixed for 30 seconds.
10. The stirrer was turned off.
11. The floc rise rate and sludge characteristics were noted.
12. The system was allowed to stand for 2 minutes.
13. The water clarity was measured, as % transmittance using a Bausch and Lomb Spectronic mini 20 spectrophotometer @450 nm.

EXAMPLES 1–5

1. A CIL white water-borne paint was dispersed in water containing 500 ppm sodium carbonate as the alkalinity source and was then treated with 3900 ppm of aluminum chlorohydrate. The treated paint solids were then flocculated with a nonionic polyacrylamide according to the general test procedure given above. All of the captured paint floated, the supernatant clarity was 93% and the final pH was 8.2.

2. A CIL white water-borne paint was dispersed in water containing 1500 ppm sodium bicarbonate as the alkalinity source and was then treated with 2000 ppm of aluminum chlorohydrate. The treated paint solids were flocculated with a nonionic polyacrylamide according to the general test procedure given above. All of the captured paint floated, the supernatant clarity was 97% and the final pH was 7.5.

3. A CIL metallic silver water-borne paint was dispersed in water containing 400 ppm sodium carbonate as the alkalinity source and was then treated with 1000 ppm of an AlCL$_3$/polyacrylamide blend, which resulted in 80% supernatant clarity and 100% of the captured paint floating.

Figure 4:
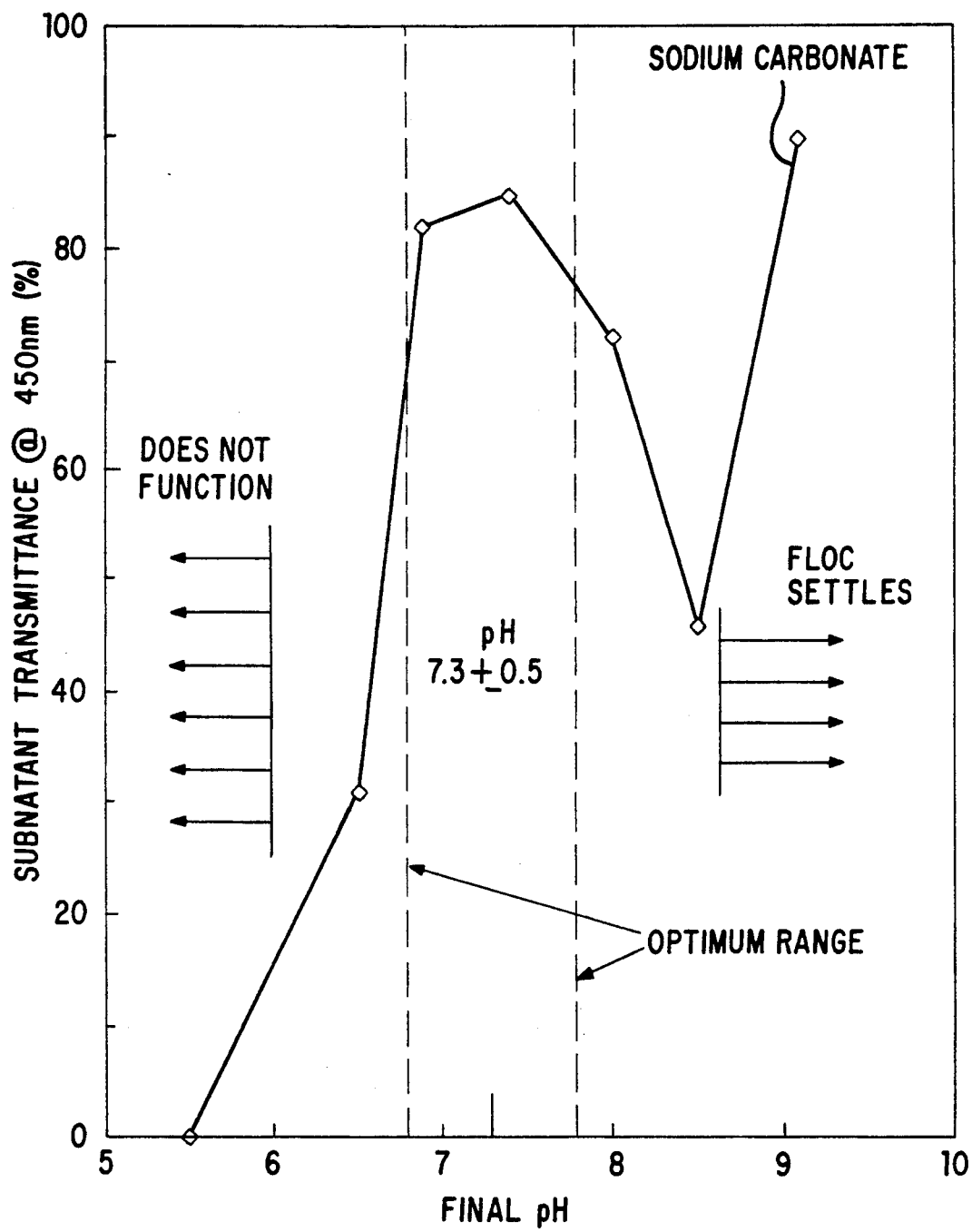
FIG. 4 shows the impact of pH on treatment performance, in terms of subnatant clarity. In the system represented by this figure, a CIL white water-based paint was treated with soda ash and aluminum chlorohydrate.

4. A CIL white water-borne paint was dispersed in water containing various amounts of sodium carbonate alkalinity. The treated paint solids were then flocculated with a nonionic polyacrylamide according to the general test procedure given above. The final pH was recorded and related to the water clarity. The results are illustrated in FIG. 4.

5. A blend of BASF water-borne paints was run according to the general procedure given above. The pH of each test was maintained at about 7.5. The alkalinity was adjusted to accommodate the different dosages of aluminum salt using sodium carbonate. Various aluminum salts were evaluated for performance and the relative equivalent dosage required to produce comparable water clarity was established. Equivalent dosage (for this example) is defined as the amount of aluminum salt required to produce a water with 90% transmittance. The relative equivalent dosage relates the dosage of the various aluminum salts to that of alum.

The results are summarized in Table I.

TABLE I

| Aluminum Salt | Dosage (ppm) | Transmittance @ 480 nm (%) | Relative Equivalent Dosage |
|---|---|---|---|
| PolyAluminum Chloride | 500 | 30 | 0.70X |
| | 1000 | 46 | |
| | 2000 | 84 | |
| | 2500 | 95 | |
| Aluminum Sulfate | 500 | 28 | 1.00X |
| | 1000 | 40 | |
| | 2000 | 60 | |
| | 3000 | 88 | |
| | 4000 | 88 | |
| Aluminum Chlorohydrate | 500 | 60 | 0.28X |
| | 750 | 83 | |
| | 1000 | 94 | |
| Aluminum Chloride | 500 | 35 | |
| | 1000 | 46 | |
| | 2000 | 80 | |
| | 2500 | 86 | |
| | 4000 | 98 | |

What is claimed is:

1. A method of treating the circulating water of a paint spray booth system used to capture over-sprayed, water-borne paint, which method comprises:
   (a) maintaining the pH of said circulating water between about 5.0 and 9.0, while maintaining the alkalinity of said circulating water within the range of 50–2,000, on a calcium carbonate basis;
   (b) adding to said circulating water an effective amount of an aluminum salt;
   (c) contacting said over-sprayed, water-borne paint with said circulating water, after completing step (a) and before or after completing step (b);
   (d) adding an effective amount of a flocculant to said water after completing steps (a), (b) and (c); and
   (e) removing the resulting sludge from said circulating water.

2. The method of claim 1, wherein said aluminum salt is selected from the group consisting of aluminum chlorohydrate, aluminum chloride, polyaluminum chloride and blends thereof.

3. The method of claim 2, wherein said aluminum salt is a polyaluminum chloride.

4. The method of claim 2, wherein said aluminum salt is a blend.

5. The method of claim 2, wherein said flocculant is selected from the group consisting of long chain polyacrylamides, copolymers of acrylic acid and acrylamide and polymethacrylamides, wherein said copolymers possess an anionic functionality less than or equal to 30%, by weight.

6. The method of claim 2, wherein a cationic polyelectrolyte is used.

7. The method of claim 2, wherein the pH of said water is adjusted to between about 6 and about 9.

8. The method of claim 5, wherein said alkalinity agent is selected from the group consisting of NaOH, KOH, Na$_2$CO$_3$, NaHCO$_3$, Na metasilicate, calcium carbonate, Na tetraborate or blends thereof.

9. The method of claim 6, wherein said alkalinity agent is selected from the group consisting of NaOH, KOH, Na$_2$CO$_3$, NaHCO$_3$, Na metasilicate, calcium carbonate, Na tetraborate or blends thereof.

10. The method of claim 1, wherein the aluminum salt and the polymeric flocculant are added simultaneously.

* * * * *